3,412,105
β-ARYL-N-GUANIDINO-β-ALANINES
Andre L. Langis, St. Laurent, Montreal, Quebec, Canada, assignor to American Home Products Corporation, New York, N.Y., a corporation of Delaware
No Drawing. Filed Jan. 5, 1966, Ser. No. 518,776
11 Claims. (Cl. 260—340.5)

ABSTRACT OF THE DISCLOSURE

New β-aryl-N-guanidino-β-alanines wherein the aryl substituent is phenyl, 2- and 4-chlorophenyl, 2,4- and 3,4-dichlorophenyl, 1-naphthyl, 3,4 - dimethoxyphenyl, 3,4-methylene-dioxyphenyl and 2-methylphenyl. Compounds having a corboxylic acid group in the α-position are also disclosed. The new compounds are monoamine oxidase inhibitors, as well as long acting hypotensive agents and dosage forms are disclosed. Also disclosed is a method of preparation wherein a substituted benzaldehyde is reacted with malonic acid and aminoguanidine bicarbonate in the presence of acetic acid.

---

The present invention relates to new derivatives of β-alanine, in particular to N-guanyl-β-alanines which are also substituted in the β-position and which may carry an additional substituent in the α-position. The compounds of this invention may be represented by the generic formula

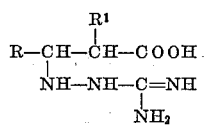

in which R represents an aromatic substituent such as the phenyl group which may also be substituted with halogen, lower alkyl groups, lower alkoxy groups, or the methylenedioxy group; or the α-naphthyl group; and $R^1$ represents hydrogen or the carboxylic acid group.

The compounds of this invention are monamine oxidase inhibitors and possess hypotensive properties characterized by an exceptionally long duration of hypotensive action. They are active both by injection and by the oral route. As hypotensive agents, they may be formulated with excipients such as lactose, starch, magnesium stearate, or magnesium silicate, in the form of tablets or capsules containing from 5 to 50 mg. of the active ingredient, or they may be formulated in the form of sterile solutions in aqueous vehicles containing from 5 to 25 mg./ml. for parenteral administration. The salts of the compounds of this invention with pharmacologically acceptable acids are pharmacologically equivalent to the compounds themselves, and may be used in the same manner as described above.

More specifically, the compounds of this invention may be conveniently prepared by reacting an aldehyde of the Formula RCHO in which R has the significance defined above with malonic acid and aminoguanidine bicarbonate in the presence of acetic acid to yield directly the compounds of Formula I in which $R^1$ represents either hydrogen or the carboxylic acid group. It may be assumed that the above reaction proceeds through an intermediate in which $R^1$ represents the carboxylic acid group. However, in some of the cases described below, this carboxylic acid group is removed by decarboxylation during the course of the reaction so that only the compound in which $R^1$ represents hydrogen may be obtained. In other cases described below, the compound in which $R^1$ represents the carboxylic acid group is obtained from the reaction mixture directly.

The following formulae in which R has the significance defined above, and examples, will illustrate this invention. All the compounds described in the following examples are identified by elementary analysis.

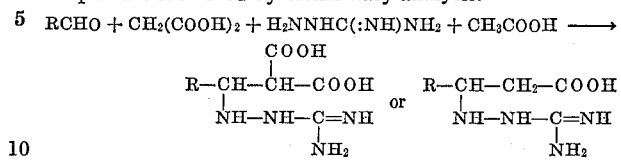

Example 1

Benzaldehyde (9.6 g., 0.1 mole) is added to a solution of 15.6 g. (0.15 mole) of malonic acid, 13.6 g. (0.1 mole) of aminoguanidine bicarbonate and 6.0 g. (0.1 mole) of glacial acetic acid in 100 ml. of ethanol. The solution is heated on a steam bath for five hours and the solvent evaporated to half the original volume. The crystals are collected and recrystallized from ethanol, yielding β-phenyl-N-guanidino-β-alanine, M.P. 198–200° C.

Example 2

2-chlorobenzaldehyde (14.0 g., 0.1 mole) is added to a solution of 13.6 (0.1 mole) of aminoguanidine bicarbonate, 15.6 g. (0.15 mole) of malonic acid and 6.0 g. (0.1 mole) of acetic acid in 100 cc. of ethanol. The solution is heated to reflux for five hours. The crystalline product is collected and recrystallized from water to yield α-carboxy-β-o-chlorophenyl - N - guanidino-β-alanine, M.P. 182–184° C.

15.0 g. of the above material are heated at 200–210° C. until the evolution of carbon dioxide has stopped. The product is recrystallized from isopropanol to yield β-(2-chlorophenyl)-N-guanidino-β-alanine, M.P. 205–207° C.

Example 3

1-naphthaldehyde (16.0 g., 0.102 mole) is added to a solution of 13.4 g. (0.128 mole) of malonic acid and 56.5 g. (0.415 mole) of aminoguanidine bicarbonate in 100 ml. of glacial acetic acid. The solution is heated on a steam bath for five hours. The solution is evaporated to dryness under reduced pressure. The product is dissolved in 200 ml. of water and the solution rendered alkaline with sodium carbonate. The crystalline material is collected and recrystallized from ethanol, to give β-(1-naphthyl)-N-guanidino-β-alanine, M.P. 203–205° C.

Example 4

4-chlorobenzaldehyde (28.1 g., 0.2 mole) is added to a solution of 31.2 g. (0.3 mole) of malonic acid and 27.2 g. (0.2 mole) of aminoguanidine bicarbonate in 75 ml. of acetic acid. The mixture is heated on a steam bath for five hours. The crystalline material is collected and recrystallized from a mixture of ethanol and water, to yield β-(4-chlorophenyl)-N-guanidino-β-alanine acetate, M.P. 173–175° C.

Example 5

3,4-dichlorobenzaldehyde (35.0 g., 0.20 mole) is added to a solution of 31.2 g. (0.30 mole) of malonic acid, 27.2 g. (0.20 mole) aminoguanidine bicarbonate and 12.0 g. glacial acetic acid in 300 cc. of ethanol. The solution is heated to reflux for five hours and then cooled. The crystals are collected on a Buchner funnel and recrystallized from water, to yield β-(3,4-dichlorophenyl)-N-guanidino-β-alanine, M.P. 170–172° C.

Example 6

Piperonal (30.0 g., 0.2 mole) is added to a solution of 31.2 g. (0.30 mole) of malonic acid, 27.2 g. (0.2 mole) of aminoguanidine bicarbonate and 12.0 g. of glacial acetic acid in 200 ml. of ethanol. The solution is heated to reflux for five hours and cooled. The crystals are collected on a Buchner funnel and recrystallized from aqueous ethanol, to yield α-carboxy-β-(3,4-methylenedioxyphenyl)-N-guanidine-β-alanine, M.P. 192–193° C.

Example 7

3,4-dimethoxybenzaldehyde (33.2 g., 0.2 mole) is added to a solution of 31.2 g. (0.30 mole) of malonic acid, 31.2 g. (0.2 mole) of aminoguanidine bicarbonate and 12.0 g. of acetic acid in 200 cc. of ethanol. The solution is heated to reflux for five hours and then cooled. The crystals are collected on a Buchner funnel and recrystallized from aqueous ethanol, to yield α-carboxy-β-(3,4-dimethoxyphenyl)-N-guanidino-β-alanine, M.P. 207° C.

Example 8

2-methylbenzaldehyde (24.0 g., 0.20 mole) is added to a solution of 31.2 g. (0.3 mole) of malonic acid, 27.2 g. (0.20 mole) of aminoguanidine bicarbonate and 12.0 g. of glacial acetic acid in 250 cc. of ethanol. The solution is heated to reflux for five hours. The desire product crystallizes upon cooling. It is recrystallized from water, to yield α-carboxy - β - (2-methylphenyl)-N-guanidino-β-alanine, M.P. 181–184° C.

Example 9

2,4-dichlorobenzaldehyde (35.0 g., 0.20 mole) is added to a solution consisting of 31.2 g. (0.30 mole) of malonic acid, 27.2 g. (0.2 mole) of aminoguanidine bicarbonate and 12.0 g. of acetic acid in 350 cc. of ethanol. The solution is heated to reflux for five hours. The desired product crystallizes upon cooling. It is recrystallized from water, to yield α-carboxy-β-(2,4-dichlorophenyl)-N-guanidino-β-alanine, M.P. 195–197° C.

I claim:

1. A compound selected from the group which consists of compounds of the formula

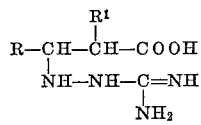

wherein R is an aromatic substituent selected from the group which consists of phenyl, monochloro-substituted phenyl, dichloro-substituted phenyl, lower alkyl substituted phenyl, lower alkoxy substituted phenyl, methylenedioxy substituted phenyl and α-naphthyl; and $R^1$ is selected from hydrogen and the carboxylic acid group; and salts of said compound with pharmacologically acceptable acids.

2. A compound as described in claim 1 which is β-phenyl-N-guanidino-β-alanine.

3. A compound as described in claim 1 which is α-carboxy-β-o-chlorophenyl-N-guanidino-β-alanine.

4. A compound as described in claim 1 which is β-(2-chlorophenyl)-N-guanidino-β-alanine.

5. A compound as described in claim 1 which is β-(1-naphthyl)-N-guanidino-β-alanine.

6. A compound as described in claim 1 which is β-(4-chlorophenyl)-N-guanidino-β-alanine acetate.

7. A compound as described in claim 1 which is β-(3,4-dichlorophenyl)-N-guanidino-β-alanine.

8. A compound as described in claim 1 which is α-carboxy-β-(3,4 - methylenedioxyphenyl)-N-guanidino-β-alanine.

9. A compound as described in claim 1 which is α-carboxy-β-(3,4-dimethoxyphenyl)-N-guanidino-β-alanine.

10. A compound as described in claim 1 which is α-carboxy-β-(2-methylphenyl)-N-guanidino-β-alanine.

11. A compound as described in claim 1 which is α-carboxy-β-(2,4-dichlorophenyl)-N-guanidino-β-alanine.

References Cited

UNITED STATES PATENTS 3,291,829   12/1966   Mull _____ 260—340.5

FOREIGN PATENTS 225,424   3/1958   Australia.
1,476,752   3/1967   France.

NICHOLAS S. RIZZO, *Primary Examiner.*

J. H. TURNIPSEED, *Assistant Examiner.*